(12) United States Patent
Xu et al.

(10) Patent No.: US 9,957,112 B1
(45) Date of Patent: May 1, 2018

(54) PRODUCT TRANSFER DEVICE

(71) Applicants: BOE Technology Group Co., Ltd., Beijing (CN); Hefei Xinsheng Optoelectronics Technology Co., Ltd., Anhui (CN)

(72) Inventors: Min Xu, Beijing (CN); Jiajia Shan, Beijing (CN); Yu Yang, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 0 days. days.

(21) Appl. No.: 15/676,108

(22) Filed: Aug. 14, 2017

(30) Foreign Application Priority Data

Nov. 1, 2016 (CN) .......................... 2016 2 1 167115

(51) Int. Cl.
*B65G 41/00* (2006.01)
*B65G 35/06* (2006.01)
*B65G 19/20* (2006.01)
*B65G 29/00* (2006.01)
*G02F 1/1341* (2006.01)

(52) U.S. Cl.
CPC ......... *B65G 35/063* (2013.01); *B65G 19/205* (2013.01); *B65G 29/00* (2013.01); *B65G 2201/02* (2013.01); *G02F 1/1341* (2013.01)

(58) Field of Classification Search
CPC ..... B65G 41/002; B65G 41/005; B65G 47/80
USPC .................................................. 198/375, 409
See application file for complete search history.

(56) References Cited

U.S. PATENT DOCUMENTS

| 4,339,025 | A | * | 7/1982 | McCombie | ............... | A24C 5/35 |
| | | | | | | 198/347.3 |
| 7,607,608 | B2 | * | 10/2009 | Morris | ...................... | B62B 3/00 |
| | | | | | | 182/69.6 |
| 7,971,709 | B2 | * | 7/2011 | Krups | ................... | B61B 10/043 |
| | | | | | | 198/465.1 |
| 8,062,098 | B2 | * | 11/2011 | Duescher | ................ | B24B 37/14 |
| | | | | | | 451/259 |
| 8,080,204 | B2 | * | 12/2011 | Ryan | ...................... | G01N 35/04 |
| | | | | | | 198/345.1 |
| 8,239,988 | B2 | * | 8/2012 | Brenner | ................ | A47C 16/025 |
| | | | | | | 5/648 |
| 8,539,739 | B2 | * | 9/2013 | Pierson | ................ | B65G 47/086 |
| | | | | | | 414/799 |
| 8,882,076 | B2 | * | 11/2014 | Scelfo | .................... | B65D 19/38 |
| | | | | | | 211/164 |
| 9,193,537 | B2 | * | 11/2015 | Hannikainen | ......... | B02C 21/026 |
| 9,287,151 | B2 | * | 3/2016 | Chen | ................. | H01L 21/67742 |
| 2005/0123387 | A1 | * | 6/2005 | Pollack | ................. | H01L 21/681 |
| | | | | | | 414/222.01 |

(Continued)

*Primary Examiner* — Joseph Dillon, Jr.
(74) *Attorney, Agent, or Firm* — Westman, Champlin & Koehler, P.A.

(57) ABSTRACT

Embodiments of the present invention provide a product transfer device. The product transfer device includes a moving assembly, a supporting assembly and a rotating assembly. The moving assembly is configured to drive the supporting assembly to move, the supporting assembly is configured such that a product is placed on the supporting assembly, and the rotating assembly is able to be connected with the supporting assembly to rotate the product placed on the supporting assembly.

14 Claims, 4 Drawing Sheets

(56) References Cited

U.S. PATENT DOCUMENTS

| | | | |
|---|---|---|---|
| 2009/0081011 A1* | 3/2009 | Kaufmann | E04H 6/22 414/229 |
| 2009/0173597 A1* | 7/2009 | Kupetz | A47L 15/248 198/339.1 |
| 2009/0267626 A1* | 10/2009 | Hosaka | G01R 31/2893 324/754.03 |
| 2010/0003904 A1* | 1/2010 | Duescher | B24B 37/14 451/259 |
| 2010/0116950 A1* | 5/2010 | Tallent | A47F 5/0087 248/130 |
| 2011/0062641 A1* | 3/2011 | Sato | B65G 49/061 269/21 |
| 2011/0070061 A1* | 3/2011 | Scelfo | B65D 19/38 414/781 |
| 2011/0223835 A1* | 9/2011 | Duescher | B24B 37/107 451/28 |
| 2013/0185884 A1* | 7/2013 | Ko | B08B 1/006 15/209.1 |
| 2013/0190912 A1* | 7/2013 | Jywe | G05B 19/4097 700/98 |
| 2013/0313400 A1* | 11/2013 | Hannikainen | B02C 21/026 248/647 |
| 2015/0298271 A1* | 10/2015 | Murata | B23Q 7/1431 414/222.07 |
| 2017/0108522 A1* | 4/2017 | Baer | G01N 35/04 |
| 2017/0146595 A1* | 5/2017 | Tamura | G01R 31/2891 |
| 2017/0212140 A1* | 7/2017 | Ferihumer | G01N 35/04 |
| 2017/0232679 A1* | 8/2017 | Gardiner | B29C 67/0088 425/162 |
| 2017/0240359 A1* | 8/2017 | Ishibashi | B65G 17/123 |

* cited by examiner

PRODUCT TRANSFER DEVICE

CROSS-REFERENCE TO RELATED APPLICATION

This application claims priority from and the benefit of Chinese Patent Application No. 201621167115.0, filed on Nov. 1, 2016, in the State Intellectual Property Office of China, the whole disclosure of which is incorporated herein by reference.

BACKGROUND

1. Technical Field

Embodiments of the present invention relate to the field of manufacturing of a display, and particularly to a product transfer device.

2. Description of the Related Art

During manufacturing of a liquid crystal display panel, generally, a substrate is transferred between different apparatuses by means of a substrate transfer device.

SUMMARY

Embodiments of the present invention provide a product transfer device comprising:

a moving assembly, a supporting assembly, and a rotating assembly, the moving assembly is configured to drive the supporting assembly to move, the supporting assembly is configured such that a product is placed on the supporting assembly, and the rotating assembly is able to be connected with the supporting assembly to rotate the product placed on the supporting assembly.

According to embodiments of the present invention, the supporting assembly comprises: a supporting platform, a first supporting structure and a second supporting structure, each of the first supporting structure and the second supporting structure comprises at least two supporting prongs and two opposite supporting rods, each of the at least two supporting prongs has two ends which is able to be respectively lap-joined to the two supporting rods, and one of the two ends of each of the at least two supporting prongs is able to be fixed to one of the two supporting rods so that the one of the two supporting rods drives the at least two supporting prongs to move towards the other supporting rod side.

According to embodiments of the present invention, each of the at least two supporting prongs comprises supporting prong segments and a connection piece for connecting the supporting prong segments, the supporting prongs of the first supporting structure and the supporting prongs of the second supporting structure intersect one another at intersections and share the connection pieces, and the connection pieces are disposed at the intersections.

According to embodiments of the present invention, a first electromagnet is disposed at a side of each of the connection pieces, and a second electromagnet is disposed at a side, adjacent to one of the connection pieces, of each of the supporting prong segments, such that, the supporting prong segments of the each of the at least two supporting prongs are fixedly connected with the connection piece when the first electromagnets and the second electromagnets are turned on, and are disconnected from the connection piece when the first electromagnets and the second electromagnets are turned off.

According to embodiments of the present invention, in the first supporting structure, a connection plate is disposed under and fixedly connected with two of the supporting prong segments located at two ends of the connection piece, a groove is formed on an underside of the connection piece, the connection piece is able to be engaged on the connection plate through the groove, and a bottom surface of the connection piece and a bottom surface of the connection plate are flush with each other when being in an engaged state.

According to embodiments of the present invention, the second supporting structure further comprises: first engagement holes and a first latch, the first engagement holes are formed under each of two of the supporting prong segments located at two ends of the connection piece, and the first latch is able to be engaged in the first engagement holes, and is able to be inserted into and pulled out from the first engagement holes.

According to embodiments of the present invention, in at least one of the first supporting structure and the second supporting structure, a connection hole is formed in a side of each of the connection pieces, and a retractable connection rod is disposed at a side, adjacent to one of the connection pieces, of each of the supporting prong segments, such that, the supporting prong segments of the each of the at least two supporting prongs are fixedly connected with the connection piece when the retractable connection rods are extended, and are disconnected from the connection piece when the retractable connection rods are retracted.

According to embodiments of the present invention, in each of the first supporting structure and the second supporting structure, each of the supporting rods is formed with first engagement grooves which are configured to be engaged with the at least two supporting prongs, and each of the supporting rods has second engagement holes formed at two sides of each of the first engagement grooves and second latches which are able to be engaged in the second engagement holes, and which are able to be inserted into and pulled out from the second engagement holes.

According to embodiments of the present invention, the two supporting rods of the first supporting structure comprise a first supporting rod and a second supporting rod, the first supporting structure further comprises: inner guide rails disposed at two ends of the first supporting rod and outer guide rails disposed at two ends of the second supporting rod, the first supporting rod is connected with the inner guide rail through a first lifting rod, and the second supporting rod is connected with the outer guide rail through a second lifting rod.

According to embodiments of the present invention, the second supporting structure further comprises: slide rails disposed at two ends of the two supporting rods, and slide assemblies respectively disposed on the slide rails in correspondence with the two supporting rods, a third lifting rod is disposed at a bottom of each of the two supporting rods, and a retractable rod is disposed at each of two ends of each of the two supporting rods, such that the third lifting rod can drive one of the two supporting rods of the second supporting structure to lift up to a preset height, and then the retractable rods at the two ends of the one of the two supporting rods of the second supporting structure are extended to and fixedly connected with the slide assemblies located on the two slide rails.

According to embodiments of the present invention, the rotating assembly comprises: a rotating shaft and a rotating rod, the rotating shaft has a lower end disposed at the supporting platform, and an upper end connected with the rotating rod, an axis of the rotating shaft is perpendicular to a length direction of the rotating rod, and the rotating rod is formed with second engagement grooves such that the at least two supporting prongs of any one of the first supporting structure and the second supporting structure can be engaged with the rotating rod.

According to embodiments of the present invention, the moving assembly comprises: a base and a fourth lifting rod, a guide rail is disposed on the base, and the fourth lifting rod has one end located in the guide rail and the other end connected with the supporting platform.

According to embodiments of the present invention, in an initial position, the connection pieces and the supporting prongs of the first supporting structure and the second supporting structure are located in the same plane.

According to embodiments of the present invention, in an initial position, the at least two supporting prongs of the first supporting structure and the at least two supporting prongs of the second supporting structure are perpendicular to one another.

According to embodiments of the present invention, the rotating rod is located under the at least two supporting prongs of the first supporting structure and the at least two supporting prongs of the second supporting structure, such that the at least two supporting prongs of the first supporting structure are engaged with the second engagement grooves of the rotating rod in a state where the rotating rod is perpendicular to the at least two supporting prongs of the first supporting structure, and the at least two supporting prongs of the second supporting structure are engaged with the second engagement grooves of the rotating rod in a state where the rotating rod is perpendicular to the at least two supporting prongs of the second supporting structure.

BRIEF DESCRIPTION OF THE DRAWINGS

In order to describe technical solutions in embodiments of the present invention more clearly, accompanying drawings required for describing the embodiments will be simply explained as below. Apparently, the accompanying drawings for the following description are only some embodiments of the present invention. Those skilled in the art also could derive other accompanying drawings from these accompanying drawings without making a creative work.

FIG. 3-1 is a further schematic diagram showing the structure of the product transfer device according to the embodiment of the present invention;

FIG. 3-2 is still another schematic diagram showing the structure of the product transfer device according to the embodiment of the present invention;

FIG. 4-1 is a still further schematic diagram showing the structure of the product transfer device according to the embodiment of the present invention;

FIG. 4-2 is yet another schematic diagram showing the structure of the product transfer device according to the embodiment of the present invention;

DETAILED DESCRIPTION OF THE EMBODIMENTS

Figure 1:
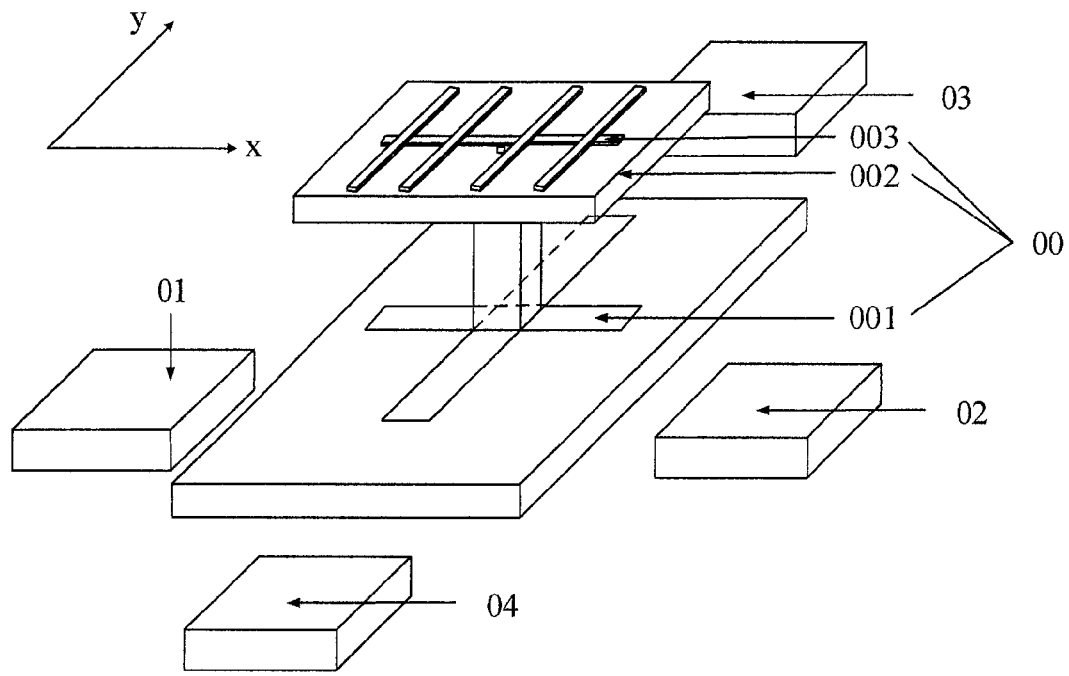
FIG. 1 is a schematic diagram showing a structure of a product transfer device according to an embodiment of the present invention.

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram showing a structure of a product transfer device 00 according to an embodiment of the present invention. As shown in FIG. 1, the product transfer device 00 comprises:

a moving assembly 001, a supporting assembly 002, and a rotating assembly 003.

The rotating assembly 003 can be connected with the supporting assembly 002. The moving assembly 001 is configured to drive the supporting assembly 002 to move, the supporting assembly 002 is configured such that a product is placed on the supporting assembly 002, and the rotating assembly 003 can be connected with the supporting assembly 002 to rotate the product placed on the supporting assembly 002.

The product transfer device 00 is configured to transfer a product. The product may be an array substrate, a color filter substrate, a display panel, or the like. For example, the product transfer device 00 first takes out a product from an upstream apparatus 01, and then places the product in one of a downstream apparatus 02, a downstream apparatus 03, and a downstream apparatus 04 which are located in different positions, so that a whole product transferring process is completed. The upstream apparatus is an apparatus where the product is located before the product is transferred, while the downstream apparatus is an apparatus where the product is located after the product is transferred. In FIG. 1, the positions of the upstream apparatus 01, the downstream apparatus 02, the downstream apparatus 03, and the downstream apparatus 04 are schematic positions, and may also be other positions in practical application. In the embodiment of the present invention, the positions of the upstream apparatus 01, the downstream apparatus 02, the downstream apparatus 03, and the downstream apparatus 04 may be any appropriate positions.

With the produce transfer device according to the embodiment of the present invention, the moving assembly drives the supporting assembly to move, and the rotating assembly rotates the product placed on the supporting assembly so that the product can be transferred to a downstream apparatus after being rotated by a fixed angle. An operation process is simple, and operational accuracy of the product transfer device is effectively improved.

Figure 2:
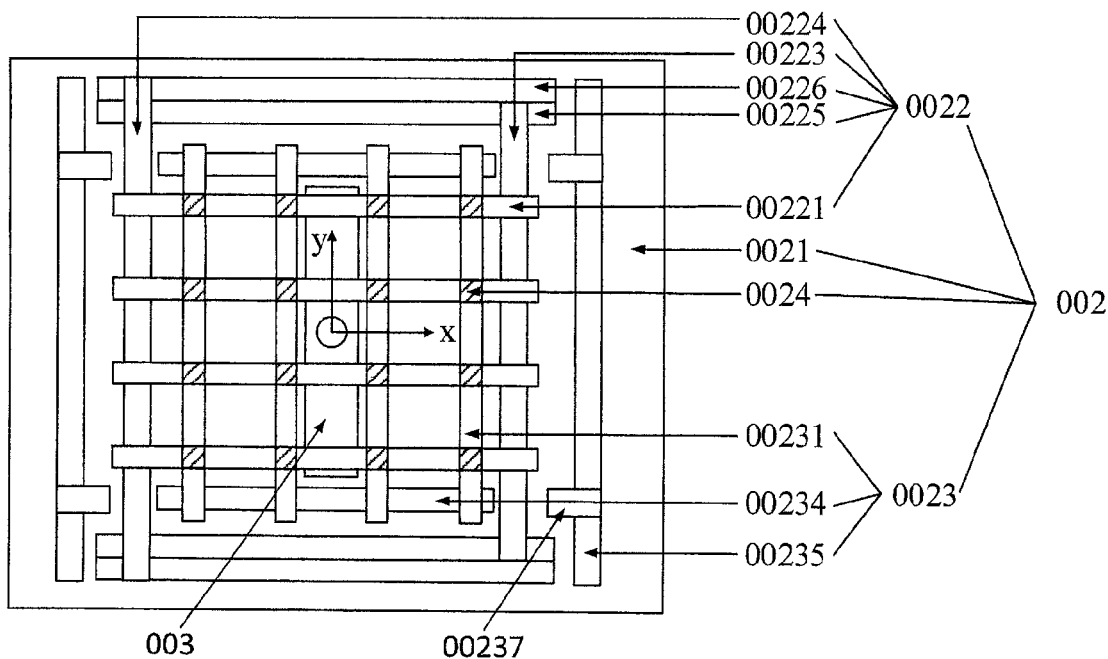
FIG. 2 is another schematic diagram showing the structure of the product transfer device according to the embodiment of the present invention.

Furthermore, as shown in FIG. 2, the supporting assembly 002 comprises: a supporting platform 0021 and two supporting structures. Each of the two supporting structures comprises at least two supporting prongs and two opposite supporting rods. Each of the at least two supporting prongs has two ends which can be respectively lap-joined to the two supporting rods, and one of the two ends of each of the at least two supporting prongs can be fixed to one of the two supporting rods so that the one of the two supporting rods drives the at least two supporting prongs to move towards the other supporting rod side, thereby transferring a product between an upstream apparatus and a downstream apparatus.

In some embodiments, the two supporting structures comprise a first supporting structure 0022 and a second supporting structure 0023. The supporting prongs 00221 of the first supporting structure 0022 are arranged in a second direction, while the supporting prongs 00231 of the second supporting structure 0023 are arranged in a first direction crossing the second direction. According to an embodiment of the present invention, the first direction may be perpendicular to the second direction. FIG. 1 and FIG. 2 schematically illustrate an example in which the first and second directions are perpendicular to each other. In some embodiments, the supporting platform 0021 is a rectangle platform. The first direction and the second direction are parallel to two sides of the rectangular platform, respectively. In FIG. 1 and FIG. 2, assuming that the first direction is a direction parallel to an X axis, i.e. a direction including a positive direction or a negative direction of the X axis, the second direction is a direction parallel to a Y axis, i.e. a direction including a positive direction or a negative direction of the Y axis. Each of the supporting prongs comprises supporting prong segments and a connection piece 0024 for connecting the supporting prong segments. The supporting prong segments are arranged in an array. A first supporting prong 00221 of the first supporting structure 0022 and a second supporting prong 00231 of the second supporting structure 0023 intersect each other at an intersection, and the first supporting prong 00221 and the second supporting prong 00231 share the connection piece 0024, and the connection piece 0024 is disposed at the intersection. The first supporting prong 00221 is any one of the supporting prongs of the first supporting structure 0022 and the second supporting prong 00231 is any one of the supporting prongs of the second supporting structure 0023. The two supporting structures are configured such that the supporting prong segments of one of the two supporting structures are connected through the common connection pieces 0024 when the one of the two supporting structures is used to transfer a product. Therefore, it is not necessary to dispose two independent sets of supporting prongs, thereby simplifying a structure of the product transfer device.

An electromagnet is disposed at a side of each of the connection pieces 0024, and an electromagnet is also disposed at a side, adjacent to one of the connection pieces 0024, of each of the supporting prong segments, such that the adjacent electromagnets respectively located at the side of the connection piece 0024 and the side of the supporting prong segment can generate opposite magnetic polarities. Therefore, mutually attractive magnetic adhesion between the electromagnets of the supporting prong segment and the connection piece 0024 can be generated when the electromagnets are turned on, and the magnetic adhesion between the electromagnets of the supporting prong segment and the connection piece 0024 is lost when the electromagnets are turned off. Therefore, the supporting prong segments and the connection piece 0024 of each supporting prong are fixedly connected to one another due to existence of the magnetic adhesion when the electromagnets are turned on, and the supporting prong segments and the connection piece 0024 of each supporting prong are disconnected from one another due to the loss of the magnetic adhesion when the electromagnets are turned off. With provision of the electromagnets, a connection between the supporting prong segment and the connection piece 0024 is simply and effectively achieved.

In some embodiments, conductive core sheets may also be disposed at four sides of the connection piece 0024, respectively. The conductive core sheets are configured to transmit signals and conduct electricity between the supporting prong segments when the connection piece 0024 and the supporting prong segments are connected to one another.

Figures 1, 3:
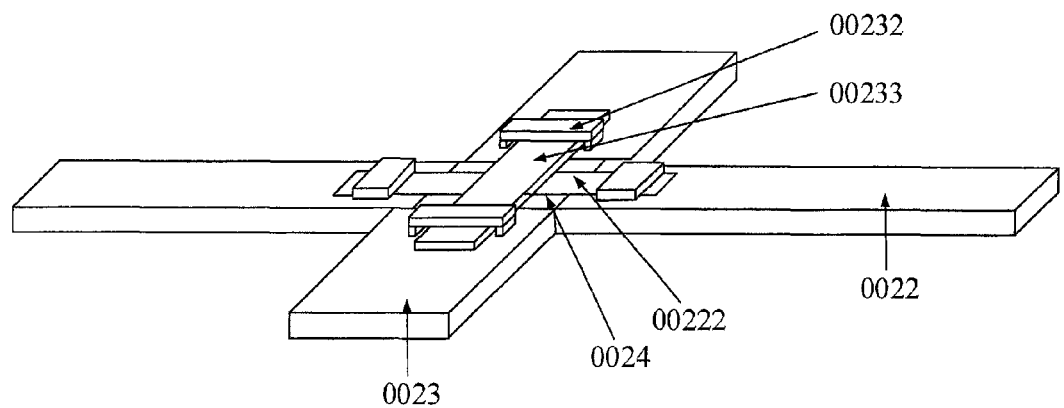
Figures 2, 3:
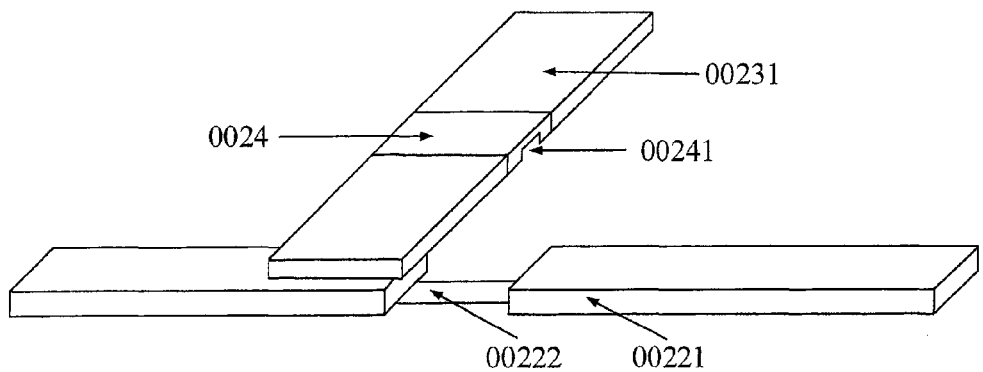

FIG. 3-1 is a schematic diagram showing structures of backs of the supporting prongs shown in FIG. 2. As shown in FIG. 3-1, the second supporting structure 0023 may further comprise: a first engagement hole 00232 and a first latch 00233. The first engagement hole 00232 is formed under each of two of the supporting prong segments located at two ends of the connection piece 0024, and the first latch 00233 is able to be engaged in the first engagement hole 00232, and can be inserted into and pulled out from the first engagement holes 00232, thereby achieving a fixed connection of the second supporting structure. For example, an upper surface of the first latch 00233 and a lower surface of the connection piece 0024 are flush with each other, and the first latch 00233 can slide to the other end of the supporting prong segment along the lower surface of the connection piece 0024. When the first supporting structure 0022 is used, i.e. after the connection piece 0024 and the supporting prong segments of the first supporting structure 0022 are magnetically connected, the first latch 00233 can connect two ends of the supporting prong segments of the second supporting structure 0023 which located at two sides of the connection piece 0024, thereby ensuring connections of both ends of each of the supporting prong segments of the second supporting structure 0023.

In some embodiments, in the first supporting structure 0022, a connection plate 00222 is disposed under and fixedly connected with two of the supporting prong segments located at two ends of the connection piece 0024, thereby achieving a fixed connection of the two of the supporting prong segments located at two ends of the connection piece 0024. The connection manner of the second supporting structure may be referred to for a manner of this fixed connection.

In addition, FIG. 3-2 is an exploded diagram of a part of the structure shown in FIG. 3-1. as shown in FIG. 3-2, a groove 00241 may be formed on an underside of the connection piece 0024, the connection piece 0024 can be engaged on the connection plate 00222 through the groove 00241, and a bottom surface of the connection piece 0024 and a bottom surface of the connection plate 00222 are flush with each other when being in an engaged state. With provision of the connection plate 00222, both ends of each of the supporting prong segments can be fixedly connected, thereby enhancing connections of both ends of each of the supporting prong segments.

In some embodiments, in the first supporting structure 0022, grooves are also formed on undersides of two of the supporting prong segments located at the two ends of the connection piece 0024. The manner of forming the groove 00241 on the underside of the connection piece 0024 may be referred to for a manner of forming the grooves on the undersides of the two of the supporting prong segments. The corresponding connection plate 00222 may be slide in the grooves on the undersides of the two of the supporting prong segments and the groove on the underside of the connection piece 0024. In the case where the connection plate 00222 is engaged in the grooves of the supporting prong segments of the first supporting structure 0022, the bottom surface of the connection plate 00222 and bottom surfaces of the supporting prong segments of the first supporting structure 0022 are flush with each other.

In some embodiments, a fit structure having a connection hole and a retractable connection rod is disposed in at least one of the two supporting structures. Specifically, a connection hole 00242 is formed in a side of each of the connection pieces 0024, and a retractable connection rod 00238 is disposed at a side, adjacent to one of the connection pieces 0024, of each of the supporting prong segments. The supporting prong segments of each of the at least two supporting prongs are fixedly connected with the connection piece 0024 when the retractable connection rods 00238 are extended, and are disconnected from the connection piece 0024 when the retractable connection rods 00238 are retracted. Besides the connection between the supporting prong segment and the connection piece 0024 by the electromagnets, the retractable connection rod achieves a further connection between the supporting prong segment and the connection piece 0024, thereby enhancing the connection between the supporting prong segment and the connection piece 0024 and stability of the connection between the supporting prong segment and the connection piece 0024. In some embodiments, the fit structure having the connection hole and the retractable connection rod may be disposed in each of the two supporting structures.

Figures 1, 4:
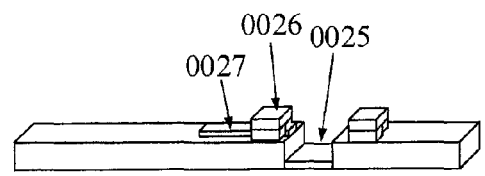
Figures 2, 4:
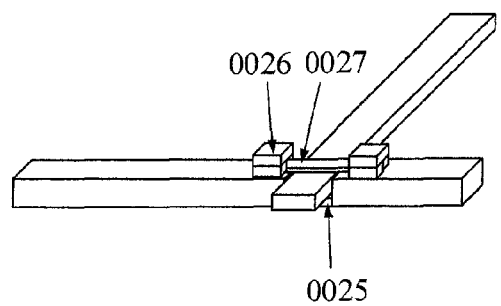

In some embodiments, as shown in FIG. 4-1, in each of the supporting structures, each of the supporting rods is formed with first engagement grooves 0025 which are configured to be engaged with the at least two supporting prongs, and each of the supporting rods has second engagement holes 0026 formed at two sides of each of the first engagement grooves 0025 and second latches 0027 which is able to be engaged in the second engagement holes 0026, and which can be inserted into and pulled out from the second engagement holes 0026. As shown in FIG. 4-2, when the supporting prong is placed on the supporting rod, the second latch 0027 is inserted into the second engagement holes 0026 to fix the supporting prong in the first engagement groove 0025 of the supporting rod, fixedly connecting the supporting prong and the supporting rod. The fixed connection enhances stability of the connection between the supporting prong and the supporting rod.

In some embodiments, a contact surface of the first engagement groove 0025 which comes into contact with the supporting prong may also be provided with an electromagnet, and a contact surface of the supporting prong which comes into contact with the first engagement groove 0025 may also be provided with an electromagnet. Thereby, the first engagement groove 0025 and the supporting prong may also be connected with each other by the electromagnets. The manner of connection between the connection piece 0024 and the supporting prong segment may be referred to for a specific manner of connection between the first engagement groove 0025 and the supporting prong, and the specific manner of connection between the first engagement groove 0025 and the supporting prong will be no longer described herein for the sake of brevity. Besides the fixation manner in which the second latch 0027 is inserted into the second engagement holes 0026, the connection manner of the first engagement groove 0025 and the supporting prong by the electromagnets further enhances the connection between the first engagement groove 0025 and the supporting prong and thus effectively enhances stability of the connection between the supporting prong and the supporting rod.

In some embodiments, as shown in FIG. 2, the two supporting rods of the first supporting structure 0022 may comprise a first supporting rod 00223 and a second supporting rod 00224. The first supporting structure 0022 further comprises: inner guide rails 00225 disposed at two ends of the first supporting rod 00223 and outer guide rails 00226 disposed at two ends of the second supporting rod 00224. The first supporting rod 00223 is connected with the inner guide rail 00225 through a first lifting rod, and the second supporting rod 00224 is connected with the outer guide rail 00226 through a second lifting rod. The first supporting rod 00223 is fixedly connected with the first lifting rod, and the second supporting rod 00224 is fixedly connected with the second lifting rod. The first lifting rod and the second lifting rod are slidable on the inner guide rails 00225 and the outer guide rails 00226, respectively, to drive the first supporting rod 00223 and the second supporting rod 00224 to slide, respectively. Initial positions of the first supporting rod 00223, the second supporting rod 00224 and the supporting prongs are located in the same plane. The initial position of the supporting prongs is a position in which the supporting prongs are located when no product has been transferred by the supporting prongs. Generally, the initial position of the supporting prongs is a preset position, and may be regarded as a position where the supporting prongs are located when the product transfer device has not been operated. When a product is transferred, the first supporting rod 00223 lifts the supporting prongs of the first supporting structure to a height by the first lifting rod, or the second supporting rod 00224 lifts the supporting prongs of the first supporting structure to a height by the second lifting rod, and then, the first supporting rod 00223 or the second supporting rod 00224 drives the supporting prongs to move in a first direction, thereby transferring the product between the upstream apparatus and the downstream apparatus.

Furthermore, the second supporting structure 0023 may further comprise: slide rails 00235 disposed at two ends of the two supporting rods 00234, and slide assemblies 00237 respectively disposed on the slide rails 00235 in correspondence with the two supporting rods 00234. The slide assembly 00237 may comprise a gripping member. The gripping member may comprise the latch and the engagement holes shown in FIG. 4-1 and FIG. 4-2. A third lifting rod is disposed at a bottom of each of the two supporting rods 00234. With provision of the slide rail 00235, the third supporting rod 00234 drives the supporting prongs, lap-joined to the third supporting rod 00234, to move in a second direction when the third supporting rod 00234 slides along the slide rail 00235, thereby transferring the product between the upstream apparatus and the downstream apparatus.

Figure 5:
FIG. 5 is a yet further schematic diagram showing the structure of the product transfer device according to the embodiment of the present invention.

As shown in FIG. 5, a retractable rod 00236 is disposed at each of two ends of each of the two supporting rods 00234. The third lifting rod can drive a third supporting rod 00234 to lift up to a preset height, and then the retractable rods 00236 at two ends of the third supporting rod 00234 are extended to and fixedly connected with, the slide assemblies 00237 located on the two slide rails 00235, for example the gripping members of the slide assemblies 00237 in the same manner as shown in FIG. 4-1 and FIG. 4-2. The third lifting rod 00234 is any one of the two supporting rods 00234 of the second supporting structure. The retractable rods 00236 at two ends of the third supporting rod 00234 may be fixedly connected with the slide assemblies 00237 located on the two slide rails 00235 by gripping, by means of the gripping members, the retractable rods 00236 onto the slide assemblies 00237 located on the two slide rails 00235, or the manner of the fixed connection between the connection plate and the supporting prong segments located at two ends of the connection piece in the first supporting structure may be referred to for a manner of the fixed connection between the retractable rods 00236 and the slide assemblies 00237. The manner of the fixed connection between the retractable rods 00236 and the slide assemblies 00237 will be no longer described herein for the sake of brevity.

Figure 6:
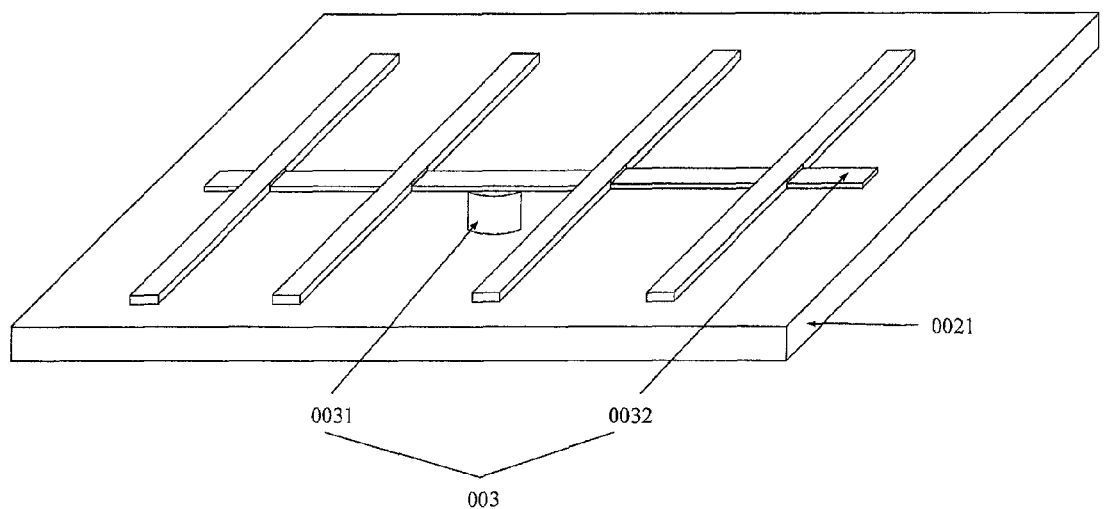
FIG. 6 is another schematic diagram showing the structure of the product transfer device according to the embodiment of the present invention.

In some embodiments, as shown in FIG. 6, the rotating assembly 003 may comprise: a rotating shaft 0031 and a rotating rod 0032. The rotating shaft 0031 has a lower end disposed at the supporting platform 0021, and an upper end connected with the rotating rod 0032. An axis of the rotating shaft 0031 is perpendicular to a length direction of the rotating rod 0032. The rotating rod 0032 is formed with second engagement grooves configured to be engaged with the supporting prongs such that the at least two supporting prongs of any one of the two supporting structures can be engaged with the rotating rod 0032. The rotating shaft 0031 has retractable and rotatable functions. When the rotating shaft 0031 needs to drive the rotating rod 0032 to rotate, the rotating shaft 0031 is extended and drives the two supporting structures to lift up to a preset height, and then the rotating shaft 0031 is rotated and drives the rotating rod 0032 and the supporting prongs placed on the rotating rod 0032 to rotate synchronously, thereby rotating a product placed on the supporting prongs. Further, a portion of the second engagement groove which comes into contact with the supporting prong and a corresponding location of the supporting prong may be provided with electromagnets. When the rotating rod 0032 and the supporting prongs are rotated, the rotating rod 0032 and the supporting prongs may be fixedly connected by magnetic adhesion generated when the electromagnets are turned on, thereby enhancing stability of the rotating rod 0032 and the supporting prongs when they are rotated.

Figure 7:
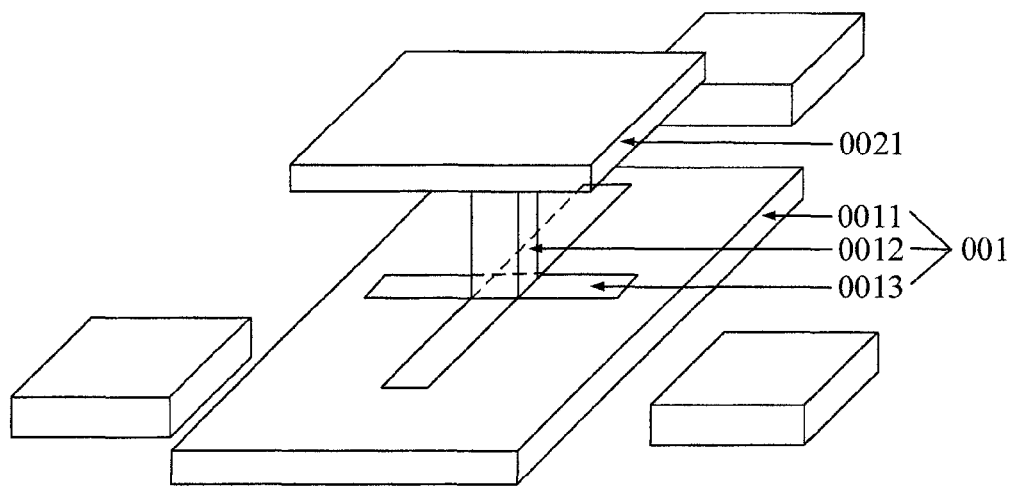
FIG. 7 is a further schematic diagram showing the structure of the product transfer device according to the embodiment of the present invention.

In some embodiments, as shown in FIG. 7, the moving assembly 001 comprises: a base 0011 and a fourth lifting rod 0012. A guide rail 0013 is disposed on the base 0011, and the fourth lifting rod 0012 has one end located in the guide rail 0013 disposed on the base 0011 and the other end connected with the supporting platform 0021.

The guide rail 0013 is disposed on the base 0011 so that the fourth lifting rod 0012 with the one end located in the guide rail 0013 is slidable along the guide rail 0013. While the fourth lifting rod 0012 slides along the guide rail 0013, it can drive the supporting platform 0021 connected to the other end of the fourth lifting rod 0012 to move synchronously with the fourth lifting rod 0012, so that the product transfer device transfers a product between the upstream apparatus and the downstream apparatus which are located in different positions. As a result, the product transfer device is not limited by a relative position between the upstream apparatus and the downstream apparatus when it transfers a product. In addition, the fourth lifting rod 0012 may also be configured to adjust a height of the supporting platform 0021, so that the supporting platform 0021 is adapted to transfer a product between the upstream apparatus and the downstream apparatus which are at different heights.

In some embodiments, the product transfer device may further comprise a control module. The control module is coupled with the moving assembly, the supporting assembly, and the rotating assembly, and is configured to control the moving assembly, the supporting assembly and the rotating assembly to move. The control module may be a controller or a processor. For example, the controller is a programmable logic controller (PLC). In some embodiments, the control module may be coupled with the conductive core sheets to control the conductive core sheets to transmit signals; the control module may be coupled with the latches (including the first latches 00233 and the second latches 0027) to control the latches to be pulled out and inserted; the control module may further be coupled with the retractable connection rods to control the retractable connection rods to be extended and retracted; the control module may further be coupled with the retractable rods 00236 to control the retractable rods 00236 to be extended and retracted; the control module may also be coupled with the rotating shaft 0031 to control the rotating shaft 0031 to be extended, retracted, and rotated; and the control module may further be coupled with the rotating rod 0032 to control the electromagnets of the rotating rod 0032 to be turned on and off.

In different situations, the control module needs to control different components of the product transfer device differently. For example, controlling methods performed by the control module will described by taking the product transfer device shown in FIG. 1 and FIG. 2 as an example in the embodiments of the present invention. It is assumed that the product transfer device is the product transfer device 00 shown in FIG. 1 and FIG. 2. FIG. 3-1 to FIG. 7 may be referred to for structures of components of the product transfer device, respectively. A fit structure having a connection hole and a retractable connection rod is disposed in the second supporting structure of the two supporting structures, while no fit structure having the connection hole and the retractable connection rod is disposed in the first supporting structure of the two supporting structures.

When no product has been transferred by both the first supporting prongs 00221 and the second supporting prongs 00231, the control module may control the first supporting prongs 00221, the second supporting prongs 00231, and the corresponding connection pieces 0024 to be turned on so that both the first supporting prongs 00221 and the second supporting prongs 00231 are connected with the connection pieces 0024. Meanwhile, the control module controls each of the connection plates 00222 located under the supporting prong segments of the first supporting prongs 00221 to be fixedly connected with the supporting prong segments located at two ends of the connection piece 0024, and controls the first latches 00233 to be engaged in the first engagement holes 00232. With the abovementioned controls, connections of the first supporting prongs 00221 and the second supporting prongs 00231 are achieved. FIG. 3-1 may be referred to for states of the first supporting prongs 00221 and the second supporting prongs 00231. In this case, all of the structures of the product transfer device are in their initial positions.

Figure 8:
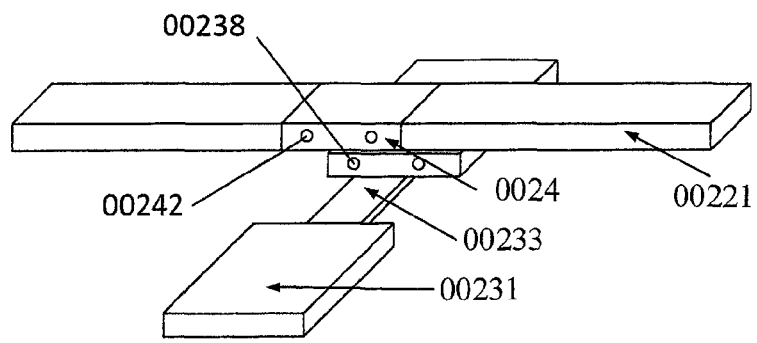
FIG. 8 is still another schematic diagram showing the structure of the product transfer device according to the embodiment of the present invention.

When a product is transferred by the first supporting prongs 00221, the control module controls the electromagnets respectively located at a side of each of the supporting prong segments of the first supporting prongs 00221 and a side of the connection piece 0024 adjacent to the each of the supporting prong segments to be turned on, so that they are connected with each other due to existence of magnetic adhesion generated by turning on the electromagnets. In addition, the control module controls the connection plate 00222 to connect the supporting prong segments located at two ends of the connection piece 0024. Besides the connections among the supporting prong segments by the common connection pieces 0024, the connection plates 00222 achieve further connections among the supporting prong segments. Meanwhile, the control module controls the electromagnets respectively located at a side of each of the supporting prong segments of the second supporting prongs 00231 and a side of the connection piece 0024 adjacent to the each of the supporting prong segments to be turned off, so that they are disconnected from each other due to loss of magnetic adhesion between the electromagnets. In this case, the supporting prong segments of the second supporting prongs 00231 and the connection pieces 0024 are in a disconnected state. Meanwhile, the control module controls the first latches 00233 to be engaged in the first engagement holes 00232 so that the supporting prong segments of the second supporting prongs 00231 are still maintained in a connected state. In this case, FIG. 8 may be referred to for connection states of the first supporting prongs and the second supporting prongs. The connection states of the first supporting prongs 00221 and the second supporting prongs 00231 are determined. After that, if the first supporting prongs need to be moved towards the negative direction of the X axis, the control module controls the first lifting rods located between the inner guide rails 00225 and the first supporting rod 00223 to lift up the first supporting rod 00223, so as to drive the first supporting prongs 00221, lap-joined to the first supporting rod 00223, to lift up synchronously with the first supporting rod 00223, thereby separating the first supporting prongs 00221 from the second supporting prongs 00231. Meanwhile, the control module controls the first supporting prongs 00221 to be engaged in the first engagement grooves 0025 of the first supporting rod 00223, and controls the second latches 0027 to be inserted into the second engagement holes 0026, thereby fixedly connecting the first supporting prongs 00221 and the first supporting rod 00223. In this case, the control module may also control the electromagnets respectively located in corresponding positions of the first supporting prongs 00221 and the first supporting rod 00223 to be turned on, in order to connect them. Then, the control module controls the first lifting rods to slide towards the negative direction of the X axis in the inner guide rails 00225, so that the first lifting rods can drive the first supporting rod 00223 to move synchronously towards the negative direction of the X axis. Similarly, if the first supporting prongs need to be moved towards the positive direction of the X axis, the control module controls the second lifting rods to lift up the second supporting rod 00224, so that the second supporting rods 00224 drive the first supporting prongs 00221 to lift up synchronously, thereby separating the first supporting prongs 00221 from the second supporting prongs 00231. Meanwhile, the control module controls the first supporting prongs 00221 to be engaged in the first engagement grooves 0025, and controls the second latches 0027 to be inserted into the second engagement holes 0026, thereby fixedly connecting the first supporting prongs 00221 and the second supporting rod 00224. Then, the control module controls the second lifting rods to slide towards the positive direction of the X axis in the outer guide rails 00226, so that the second lifting rods drive the second supporting rod 00224 to move synchronously towards the positive direction of the X axis. A product can be transferred between upstream and downstream apparatuses of the product transfer device in the first direction by moving the first supporting prongs in the first direction.

When a product is transferred by the second supporting prongs 00231, the control module controls the electromagnets respectively located at a side of each of the supporting prong segments of the second supporting prongs 00231 and a side of the connection piece 0024 adjacent to the each of the supporting prong segments to be turned on, so that they are connected with each other due to existence of magnetic adhesion of the electromagnets. Meanwhile, the control module controls the retractable connection rod, disposed at a side, adjacent to one of the connection pieces 0024, of each of the supporting prong segments of the second supporting prongs 00231, to be extended into the connection hole formed in a side of the one of the connection pieces 0024, so that the supporting prong segments and the corresponding connection pieces 0024 are connected. Further, the control module controls the first latches 00233 disposed under the supporting prong segments of the second supporting prongs 00231 to be pulled out from the first engagement holes 00232, thereby releasing the connections, among ends of the supporting prong segments, which are achieved by inserting the first latches 00233 into the first engagement holes 00232. Meanwhile, the electromagnets respectively located at a side of each of the supporting prong segments of the first supporting prongs 00221 and a side of the connection piece 0024 adjacent to the each of the supporting prong segments are controlled to be turned off, so that they are disconnected from each other and are in a disconnected state. However, since the connection plates 00222 located under the first supporting prongs 00221 connect ends of the supporting prong segments, all the first supporting prongs 00221 are still maintained in a connected state. In this case, FIG. 9 may be referred to for connection states of the first supporting prongs and the second supporting prongs. The connection states of the second supporting prongs 00231 and the first supporting prongs 00221 are determined. After that, the control module controls the third lifting rods located at the bottom of the third supporting rod 00234 to lift up the third supporting rod 00234, so as to drive the second supporting prongs 00231 to lift up synchronously with the third supporting rod 00234, thereby separating the first supporting prongs 00221 from the second supporting prongs 00231. The second supporting prongs 00231 and the third supporting rod 00234 are synchronously lifted up to a preset height, and then the control module controls the retractable rods 00236 located at two ends of the third supporting rod 00234 to be extended to and fixedly connected with the slide assemblies 00237 located on the slide rails 00235. Then, the control module may control the slide assemblies 00237 to slide along the second direction in the slide rails 00235 so that the slide assemblies 00237 can drive the third supporting rod 00234 to move along the second direction, thereby freely moving the second supporting prongs 00231 in the second direction and transferring a product.

When a product is transferred by the product transfer device 00, the product taken out from an upstream apparatus may also be rotated and then be placed onto the downstream apparatus. For example, controlling methods performed by the control module when a product is rotated are as follows.

A product is taken from an upstream apparatus by the supporting prongs. After that, if the product needs to be rotated and then transferred to a downstream apparatus, the control module controls the rotating shaft 0031, disposed at the supporting platform, to be extended, so that the rotating shaft 0031 drives the rotating rod 0032 connected with it to lift up synchronously. When the rotating rod 0032 is lifted up to come into contact with the supporting prongs, the supporting prongs are located into the second engagement grooves formed on the rotating rod 0032. Meanwhile, the control module controls the electromagnets, disposed at portions of the second engagement grooves of the rotating rod 0032 which come into contact with the supporting prongs and corresponding locations of the supporting prongs, to be turned on, thereby fixedly connecting the rotating rod 0032 and the supporting prongs. In this case, the control module simultaneously controls the electromagnets of the connection pieces 0024, the first supporting prongs 00221 and the second supporting prongs 00231 to be turned on, so that the connection pieces 0024 are fixedly connected with the first supporting prongs 00221 and the second supporting prongs 00231 and the connection pieces 0024, and the first supporting prongs 00221 and the second supporting prongs 00231 are formed into an integrated structure by the fixed connection. Then, the control module controls the rotating shaft 0031 to drive the supporting prongs to continue to lift up to a preset height as a whole, and then controls the rotating shaft 0031 to stop lifting and to rotate by a preset angle, thereby rotating the product on the supporting structures.

In some embodiments, the product transfer device 00 can transfer a product in the first direction and the second direction by alternately using the first supporting prongs 00221, the second supporting prongs 00231, and the rotating function of the product transfer device 00. The product transfer device 00 can transfer a product in any specific direction.

Figure 9:
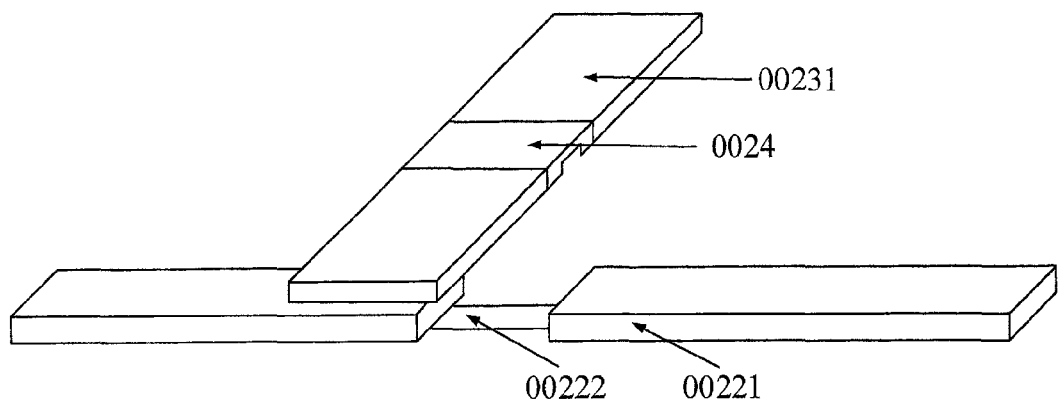
FIG. 9 is a still further schematic diagram showing the structure of the product transfer device according to the embodiment of the present invention.

For example, referring to FIG. 1 and FIG. 2, it is still assumed that the product transfer device is the product transfer device 00 shown in FIG. 1 and FIG. 2. FIG. 3-1 to FIG. 9 may be referred to for structures of components of the product transfer device, respectively. A fit structure having a connection hole and a retractable connection rod is disposed in the second supporting structure of the two supporting structures, while no fit structure having the connection hole and the retractable connection rod is disposed in the first supporting structure of the two supporting structures. Controlling methods performed by the control module will be described by taking the following several exemplary product transfer processes as an example.

In a first situation, a product is taken out from the upstream apparatus 01 and then is transferred to the downstream apparatus 02 without a rotation. In this process, the control module controls the first supporting prongs 00221 to take out the product from the upstream apparatus 01 and place the product into the downstream apparatus 02 in the first direction. Specifically, the electromagnets respectively located in corresponding positions of the first supporting prongs 00221 and the connection pieces 0024 are controlled to be turned on, thereby fixedly connecting the first supporting prongs 00221 and the connection pieces 0024. In addition, the connection plates 00222 are controlled to connect the supporting prong segments of the first supporting prongs 00221. Meanwhile, the control module controls the second latches 0027 to be inserted into the second engagement holes 0026, and controls the electromagnets respectively located at portions of the first supporting rod 00223 and parts, in contact with the portions, of right ends of the first supporting prongs 00221 to be turned on, thereby fixedly connecting the right ends of the first supporting prongs 00221 and the first supporting rod 00223. Then, the first lifting rods are controlled to lift up the first supporting rod 00223. Since the first supporting prongs 00221 are carried on the first supporting rod 00223, the first supporting prongs 00221 can be lifted up by lifting up the first supporting rod 00223. After the first supporting prongs are lifted up to a preset height, the first lifting rods are controlled to move from an initial position towards the negative direction of the X axis along the inner guide rails 00225 located in the first direction, so that the first lifting rods can drive the first supporting rod 00223 and the first supporting prongs 00221 to move synchronously towards the negative direction of the X axis. After the first supporting prongs 00221 are moved to a position where the upstream apparatus 01 is located, the first supporting prongs 00221 are controlled to extend into the upstream apparatus 01 and take out the product, and then the first lifting rods are controlled to drive the first supporting rod 00223 and the first supporting prongs 00221 to move along the positive direction of the X axis. After the first lifting rods are moved to their initial positions, they are controlled to be retracted downwards to drive the first supporting rod 00223 and the first supporting prongs 00221 to go back to their initial positions. Then, the second latches 0027 of the first supporting rod 00223 are controlled to be pulled out from the second engagement holes 0026, while the electromagnets respectively located at the portions of the first supporting rod 00223 and the parts, in contact with the portions, of the first supporting prongs 00221 are controlled to be turned off, thereby separating the first supporting prongs 00221 from the first supporting rod 00223. Meanwhile, the electromagnets respectively located at portions of the second supporting rod 00224 and parts, in contact with the portions, of the first supporting prongs 00221 are controlled to be turned on, and the second latches 0027 of the second supporting rod 00224 are controlled to be inserted into the second engagement holes 0026, thereby fixedly connecting left ends of the first supporting prongs 00221 and the second supporting rod 00224. Then, the second lifting rods are controlled to lift up the second supporting rod 00224 and the first supporting prongs 00221 to a preset height, and then to be stopped. After that, the second lifting rods are controlled to move towards the positive direction of the X axis along the outer guide rails 00226 located in the first direction, thereby transferring the product into the downstream apparatus 02. Next, the second lifting rods are again controlled to slide towards the negative direction of the X axis back to their initial positions, and then to be retracted downwards, so that the second supporting rod 00224 and the first supporting prongs 00221 go back to their initial positions. So far, a whole process in which a product is taken out from the upstream apparatus 01 and then is transferred to the downstream apparatus 02 without a rotation is completed.

In a second situation, a product is taken out from the upstream apparatus 01 and then is transferred to the downstream apparatus 03 without a rotation. In this process, the control module controls the first supporting prongs 00221 to take out the product from the upstream apparatus 01 in the first direction, and then controls the second supporting prongs 00231 to place the product into the downstream apparatus 03 in the second direction. The corresponding process in the first situation may be referred to for a process in which the first supporting prongs 00221 are controlled to transfer the product from the upstream apparatus 01 and then to return to their initial positions. A method of controlling the second supporting prongs 00231 to place the product into the downstream apparatus 03 is as follows. The electromagnets respectively located in corresponding positions of the second supporting prongs 00231 and the connection pieces 0024 are controlled to be turned on, thereby fixedly connecting the second supporting prongs 00231 and the connection pieces 0024, while the electromagnets of the first supporting prongs 00221 are controlled to be turned off, thereby disconnecting the first supporting prongs 00221 from the connection pieces 0024. In addition, the retractable connection rods disposed at sides of the supporting prong segments of the second supporting prongs 00231 are controlled to be extended into the connection holes of the connection pieces 0024, while the first latches 00233 disposed under the supporting prong segments of the second supporting prongs 00231 are controlled to be pulled out from the first engagement holes 00232. Meanwhile, the electromagnets of the second supporting prongs 00231 and the third supporting rod 00234 located on a lower side in the second direction in FIG. 2 are also controlled to be turned on, thereby fixedly connecting the second supporting prongs 00231 and the third supporting rod 00234. Then, the third lifting rods located at the bottom of the third supporting rod 00234 are controlled to be extended upwards and lift up the third supporting rod 00234, while driving the second supporting prongs 00231 to lift up the product. After the third supporting rod 00234 is lifted up to a preset height, the retractable rods 00236 located at two ends of the third supporting rod 00234 are controlled to be extended to and fixedly connected with the slide assemblies 00237 located on the slide rails 00235. Next, the slide assemblies 00237 are controlled to slide to the downstream apparatus 03 along the positive direction of the Y axis, and then the second supporting prongs 00231 are controlled to place the product into the downstream apparatus 03. After that, the slide assemblies 00237 are controlled to slide along the negative direction of the Y axis until they go back to their initial positions. Then, the third lifting rods are controlled to be retracted downwards to their initial positions. At the moment, the second supporting prongs 00231 also go back to their initial positions. So far, a whole process in which a product is taken out from the upstream apparatus 01 and then is transferred to the downstream apparatus 03 without a rotation is completed.

In a third situation, a product is taken out from the upstream apparatus 01, and is anticlockwise rotated by 180° and then is transferred to the downstream apparatus 02. In this process, the control module controls the first supporting prongs 00221 to take out the product from the upstream apparatus 01 located in the first direction. After the first supporting prongs 00221 go back to their initial positions, the rotating assembly 003 is controlled to rotate the product counterclockwise by 180°. Then, the first supporting prongs 00221 continues to be controlled to place the product into the downstream apparatus 02 located in the first direction. The corresponding process in the first situation may be referred to for a process in which the first supporting prongs 00221 are controlled to transfer the product from the upstream apparatus 01 and then to go back to their initial positions. After the product is taken and the first supporting prongs 00221 go back to their initial positions, the control module controls the first supporting prongs 00221 and the first supporting rod 00223 to be disconnected from each other. Meanwhile, the second supporting prongs 00231 are controlled to be turned on, so that the first supporting prongs 00221, the second supporting prongs 00231 and the connection pieces 0024 are connected due to existence of magnetic adhesion. Then, the rotating shaft 0031 under the supporting prongs is controlled to be extended upwards and to lift up the supporting prongs as a whole through the rotating rod 0032 to a preset height. Then, the rotating shaft 0031 is controlled to stop lifting and to begin to rotate. The rotating shaft 0031 drives the rotating rod 0032 and the supporting prongs as a whole to rotate anticlockwise by 180°. After the rotation is completed, the rotating shaft 0031 is controlled to be retracted downwards while the supporting prongs as a whole are moved downwards. Then, the first supporting prongs 00221 are controlled to place the product into the downstream apparatus 02 and then to go back to their initial positions. For specific implementation of this process, the corresponding process in the first situation may be referred to.

In a fourth situation, a product is taken out from the upstream apparatus 01, and is anticlockwise rotated by 180° and then is transferred to the downstream apparatus 03. In this process, the first supporting prongs 00221 are firstly controlled to take out the product from the upstream apparatus 01 located in the first direction. After the first supporting prongs 00221 go back to their initial positions, the rotating assembly 003 is controlled to rotate the product counterclockwise by 180°. Then, the second supporting prongs 00221 are controlled to place the product into the downstream apparatus 03 located in the second direction. The corresponding process in the third situation may be referred to for a process in which the first supporting prongs 00221 are controlled to take out the product from the upstream apparatus 01 and to rotate the product. The corresponding process in the second situation may be referred to for a process in which after the product is rotated, the second supporting prongs 00231 are controlled to send the product into the downstream apparatus 03.

In a fifth situation, a product is taken out from the upstream apparatus 01, and is anticlockwise rotated by 90° and then is transferred to the downstream apparatus 02. In this process, the first supporting prongs 00221 are firstly controlled to take out the product from the upstream apparatus 01 located in the first direction. After that, the first supporting prongs 00221 go back to their initial positions, and then the rotating assembly 003 is controlled to rotate the product counterclockwise by 90°. The second supporting prongs 00231 are again controlled to place the product into the downstream apparatus 02 located in the first direction. In some embodiments, in the rotating process, since the rotation angle is 90° so that the positions of the first supporting prongs 00221 and the second supporting prongs 00231 are exchanged, a task of placing the rotated product into the downstream apparatus 02 is done by the second supporting prongs 00231. The corresponding processes in the first to fourth situations may be referred to for a control process of the first supporting prongs 00221 and the second supporting prongs 00231 and a control process of rotating the product in the fifth situation.

In a sixth situation, a product is taken out from the upstream apparatus 01, and is anticlockwise rotated by 90° and then is transferred to the downstream apparatus 03. In this process, the first supporting prongs 00221 are controlled to take out the product from the upstream apparatus 01 located in the first direction. After the first supporting prongs 00221 go back to their initial positions, the rotating assembly 003 is controlled to rotate the product counterclockwise by 90°. Then, the first supporting prongs 00221 are controlled to place the product into the downstream apparatus 03 located in the second direction. In the rotating process, since the positions of the first supporting prongs 00221 and the second supporting prongs 00231 are exchanged, a task of placing the rotated product into the downstream apparatus 03 located in the second direction is still done by the first supporting prongs 00221. The corresponding processes in the first to fifth situations may be referred to for a specific control process in the sixth situation.

The abovementioned anticlockwise rotations are only intended for illustrative description. In some embodiments, in actual applications, the rotating assembly may drive a product to rotate clockwise. The abovementioned rotating processes may be referred to for a specific process of clockwise rotating the product which is no longer described for the sake of brevity.

In some embodiments, the abovementioned control processes may be achieved by a preset program, or in a manual manner. The control processes may be performed in any appropriate manner.

The product transfer processes in the above several situations are only some illustrative situations in the embodiments of the present invention, rather than a limitation on the product transfer process performed by the product transfer device.

It would be appreciated by those skilled in the art that for the purpose of convenient and brief description, the corresponding processes in the above several situations may be referred to for the product transfer processes in the other situations which are no longer described for the sake of brevity.

Movable components described above may comprise drive devices. The drive devices may comprise any appropriate devices which are capable of moving the movable components, such as a linear electric motor or an electric rotating machinery, or a linear electric motor or an electric rotating machinery and a transmission mechanism.

With the produce transfer device according to the embodiment of the present invention, the moving assembly drives the supporting assembly to move, and the rotating assembly rotates the product placed on the supporting assembly so that the product can be transferred to a downstream apparatus after being rotated by a fixed angle. An operation process is simple, and operational accuracy of the product transfer device is effectively improved.

The above embodiments may be optionally combined into other embodiments of the present disclosure which are no longer described herein for the sake of brevity.

The above embodiments are only used to explain the present invention, and should not be construed to limit the present invention. It will be appreciated by those skilled in the art that various changes and modifications may be made therein without departing from the spirit of the present invention, the scope of which is defined in the appended claims and their equivalents.

What is claimed is:

1. A product transfer device comprising:
a moving assembly, and a supporting assembly, wherein:
the moving assembly is configured to drive the supporting assembly to move, and the supporting assembly is configured such that a product is placed on the supporting assembly,
the supporting assembly comprises:
a first supporting structure and a second supporting structure, and
each of the first supporting structure and the second supporting structure comprises at least two supporting prongs and two opposite supporting rods, the supporting prongs of the first supporting structure and the supporting prongs of the second supporting structure intersect one another at intersections, each of the at least two supporting prongs has two ends which are able to be respectively lap-joined to the two supporting rods, and one of the two ends of each of the at least two supporting prongs is able to be fixed to one of the two supporting rods so that the one of the two supporting rods drives the at least two supporting prongs to move towards the other supporting rod side.

2. The product transfer device of claim 1, wherein:
each of the at least two supporting prongs comprises supporting prong segments, the supporting prongs of the first supporting structure and the supporting prongs of the second supporting structure further comprise common connection pieces for selectively connecting the supporting prong segments, and the connection pieces are disposed at the intersections.

3. The product transfer device of claim 2, wherein:
a first electromagnet is disposed at a side of each of the connection pieces, and a second electromagnet is disposed at a side, adjacent to one of the connection pieces, of each of the supporting prong segments, such that, the supporting prong segments of the each of the at least two supporting prongs are fixedly connected with the connection piece when the first electromagnets and the second electromagnets are turned on, and are disconnected from the connection piece when the first electromagnets and the second electromagnets are turned off.

4. The product transfer device of claim 3, wherein:
in the first supporting structure, a connection plate is disposed under and fixedly connected with two of the supporting prong segments located at two ends of the connection piece, a groove is formed on an underside of the connection piece, the connection piece is able to be engaged on the connection plate through the groove, and a bottom surface of the connection piece and a bottom surface of the connection plate are flush with each other when being in an engaged state.

5. The product transfer device of claim 4, wherein:
the second supporting structure further comprises: first engagement holes and a first latch, and
the first engagement holes are formed under each of two of the supporting prong segments located at two ends of the connection piece, and the first latch is able to be engaged in the first engagement holes, and is able to be inserted into and pulled out from the first engagement holes.

6. The product transfer device of claim 3, wherein:
in at least one of the first supporting structure and the second supporting structure, a connection hole is formed in a side of each of the connection pieces, and a retractable connection rod is disposed at a side, adjacent to one of the connection pieces, of each of the supporting prong segments, such that, the supporting prong segments of the each of the at least two supporting prongs are fixedly connected with the connection piece when the retractable connection rods are extended, and are disconnected from the connection piece when the retractable connection rods are retracted.

7. The product transfer device of claim 1, wherein:
in each of the first supporting structure and the second supporting structure, each of the supporting rods is formed with first engagement grooves which are configured to be engaged with the at least two supporting prongs, and each of the supporting rods has second engagement holes formed at two sides of each of the first engagement grooves and second latches which are able to be engaged in the second engagement holes and which are able to be inserted into and pulled out from the second engagement holes.

8. The product transfer device of claim 2, wherein:

the two supporting rods of the first supporting structure comprise a first supporting rod and a second supporting rod, the first supporting structure further comprises: inner guide rails disposed at two ends of the first supporting rod and outer guide rails disposed at two ends of the second supporting rod, the first supporting rod is connected with the inner guide rail through a first lifting rod, and the second supporting rod is connected with the outer guide rail through a second lifting rod.

9. The product transfer device of claim 8, wherein:

the second supporting structure further comprises: slide rails disposed at two ends of the two supporting rods, and slide assemblies respectively disposed on the slide rails in correspondence with the two supporting rods, and a third lifting rod is disposed at a bottom of each of the two supporting rods, and a retractable rod is disposed at each of two ends of each of the two supporting rods, such that the third lifting rod can drive one of the two supporting rods of the second supporting structure to lift up to a preset height, and then the retractable rods at the two ends of the one of the two supporting rods of the second supporting structure are extended to and fixedly connected with the slide assemblies located on the two slide rails.

10. The product transfer device of claim 1, further comprising:

a rotating assembly which is configured to be able to be connected with the supporting assembly to rotate the product placed on the supporting assembly, wherein:

the supporting assembly further comprises a supporting platform, the rotating assembly comprises: a rotating shaft and a rotating rod, and the rotating shaft has a lower end disposed at the supporting platform, and an upper end connected with the rotating rod, an axis of the rotating shaft is perpendicular to a length direction of the rotating rod, and the rotating rod is formed with second engagement grooves such that the at least two supporting prongs of any one of the first supporting structure and the second supporting structure can be engaged with the rotating rod.

11. The product transfer device of claim 1, wherein:

the supporting assembly further comprises a supporting platform, the moving assembly comprises: a base and a fourth lifting rod, a guide rail is disposed on the base, and the fourth lifting rod has one end located in the guide rail and the other end connected with the supporting platform.

12. The product transfer device of claim 1, wherein:

in an initial position, the connection pieces and the supporting prongs of the first supporting structure and the second supporting structure are located in the same plane.

13. The product transfer device of claim 1, wherein:

in an initial position, the at least two supporting prongs of the first supporting structure and the at least two supporting prongs of the second supporting structure are perpendicular to one another.

14. The product transfer device of claim 10, wherein:

the rotating rod is located under the at least two supporting prongs of the first supporting structure and the at least two supporting prongs of the second supporting structure, such that the at least two supporting prongs of the first supporting structure are engaged with the second engagement grooves of the rotating rod in a state where the rotating rod is perpendicular to the at least two supporting prongs of the first supporting structure, and the at least two supporting prongs of the second supporting structure are engaged with the second engagement grooves of the rotating rod in a state where the rotating rod is perpendicular to the at least two supporting prongs of the second supporting structure.

* * * * *